US012634367B2

(12) United States Patent
Nassor et al.

(10) Patent No.: US 12,634,367 B2
(45) Date of Patent: May 19, 2026

(54) COMMUNICATION METHODS AND DEVICES IN INTELLIGENT TRANSPORT SYSTEMS

(71) Applicant: CANON KABUSHIKI KAISHA, Tokyo (JP)

(72) Inventors: Eric Nassor, Thorigne-Fouillard (FR); Hervé Ruellan, Rennes (FR); Julien Sevin, St. Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 18/759,519

(22) Filed: Jun. 28, 2024

(65) Prior Publication Data

US 2024/0357012 A1      Oct. 24, 2024

Related U.S. Application Data

(63) Continuation of application No. 18/148,164, filed on Dec. 29, 2022, now Pat. No. 12,028,416, which is a continuation of application No. 16/950,336, filed on Nov. 17, 2020, now Pat. No. 11,575,750.

(30) Foreign Application Priority Data

Nov. 26, 2019    (GB) ..................................... 1917222

(51) Int. Cl.
*H04W 4/40* (2018.01)
*H04L 67/12* (2022.01)
(52) U.S. Cl.
CPC ............... *H04L 67/12* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 9,628,463 | B2 * | 4/2017 | Ristock | ............... H04L 12/1818 |
| 2015/0052352 | A1 * | 2/2015 | Dolev | .................. H04L 9/3278 |
| | | | | 713/156 |
| 2018/0286229 | A1 * | 10/2018 | Szuprycinski | .......... H04W 4/44 |
| 2019/0044949 | A1 * | 2/2019 | Bartfai-Walcott | .... H04W 12/63 |
| 2020/0045552 | A1 * | 2/2020 | Kim | .................... H04W 12/069 |

* cited by examiner

*Primary Examiner* — Christopher B Robinson
(74) *Attorney, Agent, or Firm* — Canon U.S.A., Inc. IP Division

(57) ABSTRACT

According to some embodiments, there is provided a Collective Perception Message, CPM, characterizing a plurality of Vulnerable Road Users based on a plurality of received VAMs, thereby allowing an ITS station to efficiently aggregate VAM messages from VRUs and retransmit information about the VRUs to other ITS stations. Consequently, the security is improved as some ITS stations may not be able to detect or identify VRU stations by themselves but thanks to the CPM, these stations can still be informed of the VRUs. According to other aspects, congestion is avoided while maintaining safety vis-à-vis VRUs thanks to the use of a different transmission scheme when the VRU is already characterized in a CPM sent to the ITS stations. Also, a receiving station can evaluate whether the content of a CPM can be trusted or not. Safety is thus improved. This is achieved thanks to the CPM that references a certificate.

7 Claims, 10 Drawing Sheets

| Octet | Bit position | Permission item | Bit value |
|---|---|---|---|
| 1 | 0 | Highly trusted role: if the disseminating ITS station is highly trusted | 0 not highly trusted, 1 highly trusted |
| 1 | 1 | Trusted role: if the disseminating ITS station is trusted | 0 not trusted, 1 trusted |
| 1 | 2 | Free space: if the disseminating ITS station is certified to provide information on free space | 0 free space not allowed in CPM, 1 free space allowed in CPM |
| 1 | 3 | VRU : if the disseminating ITS station is certified to provide information on VRU | 0 VRU not allowed in CPM, 1 VRU allowed in CPM |
| 1 | 4 | Vehicle : if the disseminating ITS station is certified to provide information on Vehicle | 0 Vehicle object not allowed in CPM, 1 Vehicle object allowed in CPM |

Fig. 7

Timer

801 Select role (AID)

805 Select sensors to be used

810 Select type of objects to be signaled

811 Filter and sort detected objects

815 Generate message content

820 Check message size

Size OK

Too large

830 Obtain signature

835 Send the message

VRU Position
VRU Type
VRU Cluster identifier [Optional]
VRU Cluster position [Optional]
VRU Cluster Size [Optional]
VRU Size
VRU speed
VRU Direction 1001
Compute VAM parameters 1010
Generate the message content 1020
Obtain signature 1025
Send the message 1030
Set timer

COMMUNICATION METHODS AND DEVICES IN INTELLIGENT TRANSPORT SYSTEMS

CROSS REFERENCE TO RELATED APPLICATIONS

This application is a continuation of U.S. patent application Ser. No. 18/148,164, filed on Dec. 29, 2022, which is a continuation of U.S. patent application Ser. No. 16/950,336, filed on Nov. 17, 2020, now issued as U.S. Pat. No. 11,575,750, on Feb. 7, 2023, which claims the benefit under 35 U.S.C. § 119(a)-(d) of United Kingdom Patent Application No. 1917222.0, filed on Nov. 26, 2019 and entitled "Communication methods and devices in intelligent transport systems," now issued as United Kingdom Patent No. 2589848 on Jun. 29, 2022. All of the above cited patent applications/patents are incorporated herein by reference in their entireties.

FIELD OF THE DISCLOSURE

The present disclosure relates generally to Intelligent Transport Systems (ITS) and more specifically to Cooperative Intelligent Transport Systems (C-ITS).

BACKGROUND

Intelligent Transport Systems (ITS) standards are developed by different organizations: the European Telecommunication Standards Institute (ETSI), the European Committee for Standardization (CEN), the International Organization for Standardization (ISO), the Society of Automotive Engineers (SAE).

ITS standards define a general architecture, specified in ETSI EN 302 665 and ISO 21217, including ITS stations (denoted ITS-S) which can be vehicles, Road Side Units (RSU), Vulnerable Road Users (VRU) carrying an ITS equipment (for instance included in a smartphone, a GPS, a smart watch or in a cyclist equipment), or any other entities or infrastructures equipped with an ITS equipment, as well as central subsystems (back-end systems and traffic management centers). ITSs may support various types of communications, for instance between vehicles (vehicle-to-vehicle (V2V), that refers in general to all kinds of road users, e.g. car-to-car) or between vehicles and fixed locations (vehicle-to-infrastructure (V2I) and infrastructure-to-vehicle (I2V), e.g., car-to-infrastructure) and are not restricted to road transport. For instance, an ITS may also deal with information related to rail, water and air transport, including navigation systems.

Cooperation within the ITS is achieved using exchange of messages (ITS message) between the ITS stations. These exchanges of messages are performed through wireless networks, referred to as V2X networks, examples of which may include 3GPP LTE-Advanced Pro, 3GPP 5G and IEEE 802.11p technology.

More specifically, ITS standards have specified several types of ITS messages to alert, inform and/or warn users and/or vehicles of a transport system. For instance, a Cooperative Awareness Message (CAM—as defined in the ETSI EN 302 637-2) may be sent by a vehicle ITS-S to share its current state (e.g. position, speed, length, width, angle). In another example, a Collective Perception Message (CPM—ETSI TR 103 562 (v0.0.20)) may be sent by an ITS station equipped with sensors, in order to share its perceived environment, notably the characteristics of its sensors, and a list of perceived objects.

In general, ITS messages are not encrypted when exchanged on V2X communications. However, the integrity of ITS messages can be verified as a signature is provided by the ITS station by which it is generated. This ITS station sending the ITS message is called the "originating" ITS station. This signature is based on digital certificates owned by the originating station. For this purpose, each station receives one or more certificates through a Public Key Infrastructure (PKI). These certificates aim at ensuring that the originating ITS station has the privilege/authorization to transmit specific ITS messages.

However, the PKI infrastructure alone cannot address all cyber security threats. For instance, misbehaving entities in possession of valid certificates can still transmit tampered data or omit data it should transmit. Additional security mechanisms have thus been deployed at the ITS stations to locally detect how much another ITS station can be trusted or misbehaves and to report a corresponding trust level to other ITS stations using dedicated messages. Based on the determined trust level of the originating ITS station, a decision may be taken to discard or not any ITS message coming from an ITS station.

As far as VRU stations (i.e. VRU equipped with ITS stations) are concerned, which include non-motorized road users (pedestrian, cyclist) as well as L class of vehicles (for example mopeds or motorcycles, etc.), the standard ETSI TR 103 300 indicates that they can also send specific messages. These messages, that are called VRU Awareness Messages (or VAMs) or personal safety message, describe the VRU and indicate the position, speed, and direction of its VRU ITS station.

However, the bandwidth reserved for V2X communication is limited and the regulation has reserved specific communication channels for safety-related ITS messages in the 5.9 GHz band. The systematic transmission of VAM messages by VRU stations may cause congestion thereby some VAM messages could be lost as well as other safety-related C-ITS messages.

There is thus a need for a method allowing congestion avoidance while maintaining safety vis-à-vis VRUs.

Another issue is that an ITS station may not be able to detect different road participants (vehicles and pedestrians), or at least not with the same reliability. As a consequence, the detecting ITS station can make mistakes when identifying the type of a detected object. It may thus happen that detected object are signaled with an incorrect classification (for instance a vehicle while there is a VRU instead) in CPM messages.

There is thus a need for a method of evaluating whether the content of a CPM message can be trusted or not by a receiving station.

SUMMARY

The present disclosure seeks to overcome the foregoing concerns.

According to a first aspect of the disclosure, there is provided a method for communicating in an Intelligent Transport System, ITS, comprising ITS stations, the method comprising the following steps at a receiving ITS station of a Vulnerable Road User, VRU:

sending, using a first transmission scheme, a first VRU Awareness Message, VAM, to the originating ITS station, the first VAM describing the VRU associated with the receiving ITS station;

receiving a Collective Perception Message, CPM, from an originating ITS station, the CPM characterizing a plurality of Vulnerable Road Users;

determining whether the VRU associated with the receiving ITS station is characterized within the received CPM; and if so, sending, using a second transmission scheme different from the first transmission scheme, a second VAM to the originating ITS station;

otherwise, sending a second VAM to the originating ITS station using the first transmission scheme.

The first aspect allows congestion avoidance while maintaining safety vis-à-vis VRUs.

This is achieved thanks to the use of a different transmission scheme when the VRU is already characterized in a CPM sent to the ITS stations.

According to embodiments, the first transmission scheme differs from the first transmission scheme by the frequency band used to send the VAM, or by the transmission technology used to send the VAM or by the value of a timer upon expiry of which sending a VAM is performed.

According to embodiments, if the VRU associated with the receiving ITS station is characterized within the CPM, the value of the timer is higher than if it is not characterized in the received CPM and/or the value of the timer is proportional to a level trust of the originating ITS station from which is the CPM.

According to some embodiments, a collective perception message is a VAM aggregation message.

According to a second aspect of the disclosure, there is provided a method for communicating in an Intelligent Transport System, ITS, comprising ITS stations, the method comprising the following steps at a receiving ITS station of a Vulnerable Road User, VRU:

sending a first VRU Awareness Message, VAM, to the originating ITS station, the first VAM describing the VRU associated with the receiving ITS station;

receiving a Collective Perception Message, CPM, from an originating ITS station, the CPM characterizing a plurality of Vulnerable Road Users;

determining whether the VRU associated with the receiving ITS station is characterized within the received CPM; and if so, skipping transmission of a second VAM to the originating ITS station;

otherwise, sending a second VAM to the originating ITS station.

According to embodiments, the method according to the first or second aspect comprises steps of:

checking intra/inter consistency of the received CPM, and updating a station trust level stored in the receiving ITS station depending on the result of the consistency check.

According to embodiments, if updating consists in decreasing a current trust level, the method comprises sending a report to other ITS stations and/or to a central authority in charge of evaluating the security of the ITS, in order to signal the misbehavior of the originating ITS station.

According to a third aspect of the disclosure, there is provided a method for communicating in an Intelligent Transport System, ITS, comprising ITS stations, the method comprising the following steps at an originating one of the ITS stations:

detecting a plurality of Vulnerable Road Users, VRU, generating a Collective Perception Message, CPM, characterizing at least part of the detected plurality of Vulnerable Road Users, and transmitting the generated CPM to one or more other ITS stations, wherein the transmitted CPM references a certificate indicating whether the originating station is allowed to transmit a CPM characterizing Vulnerable Road Users or not.

The third aspect allows evaluating whether the content of a CPM can be trusted or not by a receiving station. Safety is thus improved.

This is achieved thanks to the CPM that references a certificate. Thanks to this certificate, the receiving ITS can check whether the content of the CPM is allowed by the certificate, and can conclude whether or not it can trust the originating ITS station and the content of the CPM.

According to embodiments, the certificate includes a Service Specific Permission, SSP, indicating a level of trust (associated with the current role (identity/pseudonym)) of the originating station, and whether the originating station is authorized to send information characterizing an object of Free Space type, Road Users type, or Vehicle type.

According to embodiments, the SSP indicates that the originating station is authorized to act as an aggregator of VAMs.

According to embodiments, the method according to the third aspect comprises a step of filtering the plurality of detected VRUs in order to discard the detected VRUs that have been already signaled by a ITS station having a given level of trust so that only detected VRUs that have not been already characterized in a CPM sent from a trusted ITS station are characterized in the generated CPM.

According to embodiments, transmitting the generated CPM is performed upon expiry of a timer.

According to embodiments, the timer is set based on a current identity used by the originating station and/or the value of the timer is proportional to a level of trust associated with the current identity used by the originating station.

According to a fourth aspect of the disclosure, there is provided a method for communicating in an Intelligent Transport System, ITS, comprising ITS stations, the method comprising the following steps at a receiving one of the ITS stations:

receiving a Collective Perception Message, CPM, from an originating ITS station, the CPM characterizing a plurality of Vulnerable Road Users and referencing a certificate indicating whether the originating station is allowed to transmit a CPM characterizing Vulnerable Road Users or not; and based on the certificate referenced in the received CPM, accepting or rejecting the received CPM.

As for the third aspect, the fourth aspect allows evaluating whether the content of a CPM can be trusted or not by a receiving station. Safety is thus improved.

This is achieved thanks to the CPM that references a certificate. Thanks to this certificate, the receiving ITS can check whether the content of the CPM is allowed by the certificate, and can conclude whether or not it can trust the originating ITS station and the content of the CPM.

According to embodiments, the method according to the fourth aspect comprises steps of:

checking intra/inter consistency of the received CPM, and updating a station trust level stored in the receiving ITS station depending on the result of the consistency check.

According to embodiments, if updating consists in decreasing a current trust level, the method comprises sending a report to other ITS stations and/or to a central authority in charge of evaluating the security of the ITS, in order to signal the misbehavior of the originating ITS station.

According to a fifth aspect of the disclosure, there is provided an Intelligent Transport System, ITS, station in an ITS comprising at least one microprocessor configured for carrying out the steps of the communicating method as aforementioned.

The fifth aspect allows as similar advantages as the first, second, third, and fourth aspects aforementioned.

The first, second, third, and fourth aspects aforementioned can be combined.

Another aspect of the disclosure relates to a non-transitory computer-readable medium storing a program which, when executed by a microprocessor or computer system in an Intelligent Transport System, ITS, station of an ITS, causes the ITS station to perform any method as defined above.

The non-transitory computer-readable medium may have features and advantages that are analogous to those set out above and below in relation to the communication methods and ITS stations.

At least parts of the methods according to the disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the present disclosure can be implemented in software, the present disclosure can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present disclosure will become apparent to those skilled in the art upon examination of the drawings and detailed description. Embodiments of the disclosure will now be described, by way of example only, and with reference to the following drawings.

FIG. 7 illustrates different Service Specific Permission (SSP) items defined according to one or more aspects of the present disclosure;

The same references are used across different figures when designating same elements.

DETAILED DESCRIPTION

The invention will now be described by means of specific non-limiting exemplary embodiments and by reference to the figures.

Figure 1:
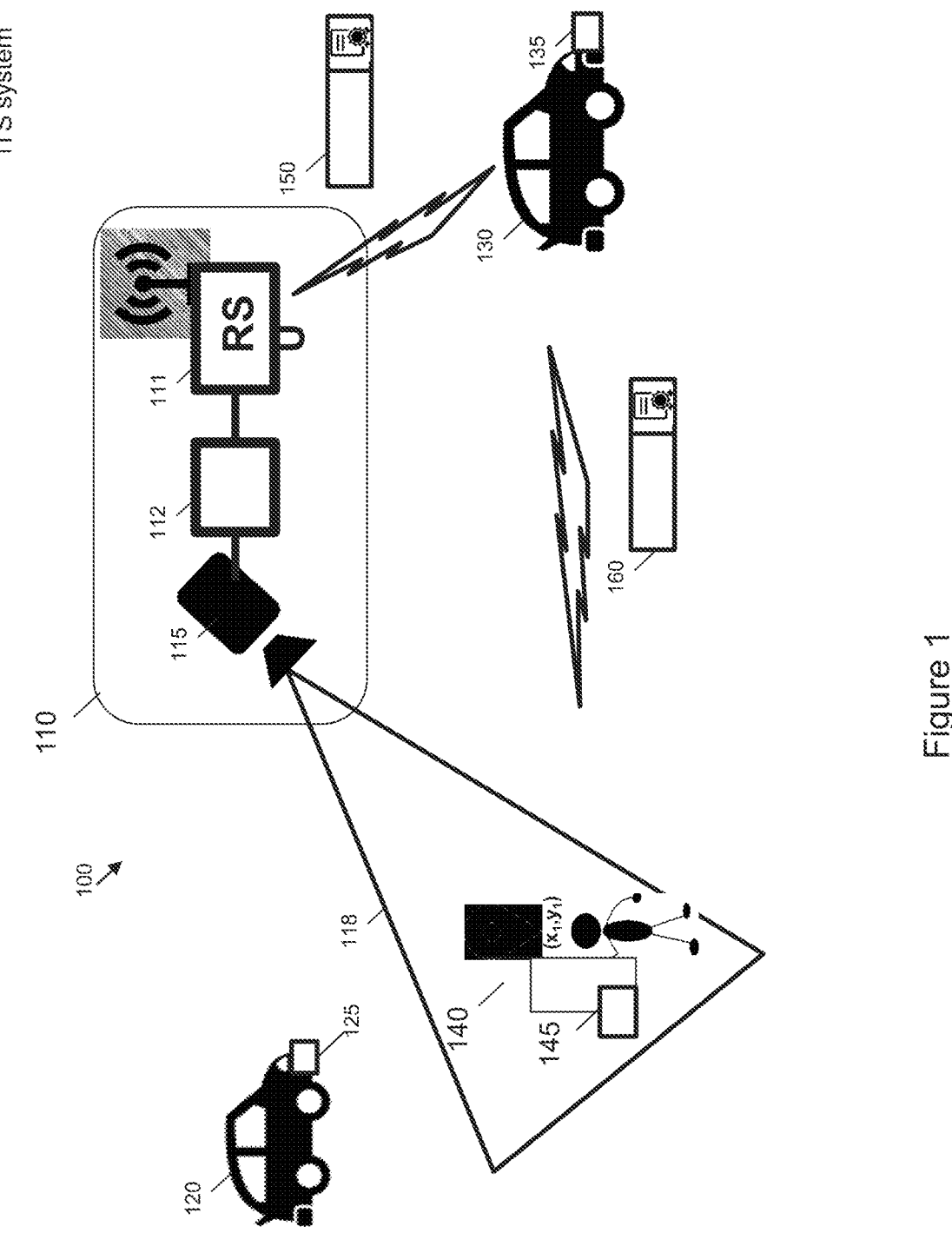
FIG. 1 illustrates an exemplary ITS in which embodiments of the disclosure may be implemented.

FIG. 1 illustrates an exemplary typical ITS in which embodiments of the disclosure may be implemented.

ITS 100 comprises a plurality of fixed and mobile ITS stations 110, 120, 130, 140. In the example shown for illustrative purposes, moving vehicles 120, 130 and mobile phone 140 contain each an on-board unit (OBU) or ITS station. An ITS station inside a vehicle is called 'vehicle ITS station', and an ITS station carried by a pedestrian or a cyclist is called 'VRU (Vulnerable Road User) ITS station'. Fixed road side entity 110 contains a road side unit (RSU) 111 also having an ITS station. Central subsystems (not shown), such as back-end systems and traffic management centers, may also form part of ITS 100.

The reference architecture of an ITS station is defined in the version V1.1.1 of the ETSI EN 302 665 specification.

An ITS station may embed or be linked to one or more local sensors that may provide information about the ITS station position and/or motion or analyze or scan an area in the vicinity of the ITS station to detect objects.

For instance, vehicles 120, 130 and mobile device 140 embed perception sensors 125, 135, 145 referred to as embedded perception sensors, which may be based on different technologies such as camera, radar, radio and lidar. The output of the embedded perception sensors is usually a list of perceived objects including each corresponding description information.

The description information of a perceived object includes its dynamic state and properties (for instance position, speed, acceleration, class, dimension, age, and so on).

In road side entity 110, road side unit (RSU) 111 is wire-connected to a Roadside Surveillance Monitoring System (RSMS) 112. RSMS 112 includes in particular a set of perception sensors, here video cameras 115 scanning the area 118, and a Video Content Analytics (VCA) module (not shown). VCA module analyzes the stream captured by the sensors/video cameras 115 in order to detect objects, referred to as perceived objects, and output a list thereof with corresponding description information. As RSMS 112 and RSU 111 are wire connected, RSMS 112 is considered as an embedded perception sensor for RSU 111.

Cooperation within ITS 100 is achieved by exchange of ITS messages between the ITS stations: V2V (vehicle-to-vehicle) messages, V2I (vehicle-to-infrastructure) messages and/or I2V (infrastructure-to-vehicle) messages. Various types of ITS messages exist to share information, alert, inform and/or warn users and/or vehicles of ITS 100.

An ITS station that sends an ITS message is referred to below as an originating ITS station while an ITS station that receives an ITS message is referred to below as a receiving ITS station.

A so-called Cooperative Awareness Message (CAM as defined in the version 1.3.1 of the ETSI EN 302 637-2 specification) is sent by any originating vehicle ITS station to share information about itself with the other ITS stations, for instance its current state (e.g. position, speed, length, width, angle).

More specifically, a so-called Vulnerable Road User Awareness Message (VAM as defined in version 0.2.0 of ETSI TS 103 300-2 specification) may be sent by any originating VRU ITS station to share information about itself with the other ITS stations, for instance its current state (e.g. position, speed, length, width, angle).

A so-called Decentralized Environmental Notification Message (DENM) is sent by an originating ITS station to alert receiving ITS stations of an event.

A so-called Collective Perception Message (CPM as defined in the version 0.0.20 of the ETSI TR 103 562 specification and/or in the version 0.0.14 of the ETSI TS 103 324 specification) is sent by any originating ITS station to share its perceived environment retrieved from its embedded perception sensors with receiving ITS stations. As described below, the CPM provides description information describing object(s) perceived by the sensors in the environment. The objects can be ITS stations (e.g. vehicles, coaches, pedestrian, bicycle, that are equipped with an OBU) or non-station obstacles (for instance mere vehicles, pedestrians, bicycles, that are not equipped with an OBU).

All exchanged messages may be encoded using for example the ASN.1 Unaligned Packed Encoding Rules as defined in Recommendation ITU-T X691/ISO/IEV 8825-2.

To secure V2X communications within ITS 100, a Public-Key-Infrastructure (PKI) (as defined in the version 1.1.1 of the ETSI TS 102 731 specification) may be used that provides security and verification required to trust the originating ITS station. The PKI-based security may be implemented through the use of certificates delivered by a certification authority to the ITS stations. Each ITS message exchanged is made of a non-encrypted message accompanied with a Digital Signature and a Pseudonym Certificate that validate the authenticity of the originating ITS station and the integrity of the message, while keeping anonymity of the originating ITS station. The Pseudonym Certificate is delivered by a certification authority. Such a certificate is referred to as an authorization ticket and ensures that the originating ITS station has the privileges and authorizations to transmit specific ITS messages. The authorization ticket is verified by the receiving ITS station.

Basically, an ITS station is required to obtain specific credentials from dedicated certification authorities in order to access the ITS network 100 and make full use of the available ITS application, services and capabilities, such as sending ITS messages. The certificate may depend on the capabilities of the ITS station (for instance its sensors or the Video Content Analytics (VCA) it can run) but also the role and the security level of the owner of the station. For example, only an ITS station with sensors with a sufficient quality of detection of a pedestrian and/or a cyclist may be authorized to send CPM messages containing VRU information. Another example is the case when the owner can demonstrate that its equipment is regularly controlled against hacking, then it may obtain a certificate characterizing a higher level of trust.

As part of the ITS station manufacturing process, a set of information elements associated with the identity of the ITS station is established within the ITS station itself and within the Enrolment Authority (EA) as defined in the version 1.2.1 of the ETSI TS 102 941 specification. In particular, the set of information elements contains a canonical identifier which is globally unique for the ITS station and a public/private key pair for cryptographic purposes (basis of the PKI mechanism).

Based on this set of information elements, the EA generates an Enrolment Certificate which contains a pseudonym provided to the ITS station during the enrolment process. The pseudonym is used for anonymity and is referred to as Enrolment Identity.

Next, after having enrolled with the EA, the ITS station requests an Authorization Authority (AA) for specific services and permissions within the EA's domain and AA's Authorization context. In particular, the AA checks the Enrolment Certificate included in the request (in particular checks the Enrolment Identity included in the Enrolment Certificate to the EA). Then, the AA provides multiple pseudonym certificates referred to as Authorization Tickets (each one including pseudonym of the ITS Station) to be used in V2X communication.

An ITS station may have several valid certificates in the same time, all having different pseudonyms. The station can then select different certificates for different messages. Due to multiple pseudonyms, this may allow avoiding station tracking and thus ensure privacy protection. In addition, as a certificate contains a list of several authorizations, different authorizations may be used by a station depending of the particular context.

Figure 2:
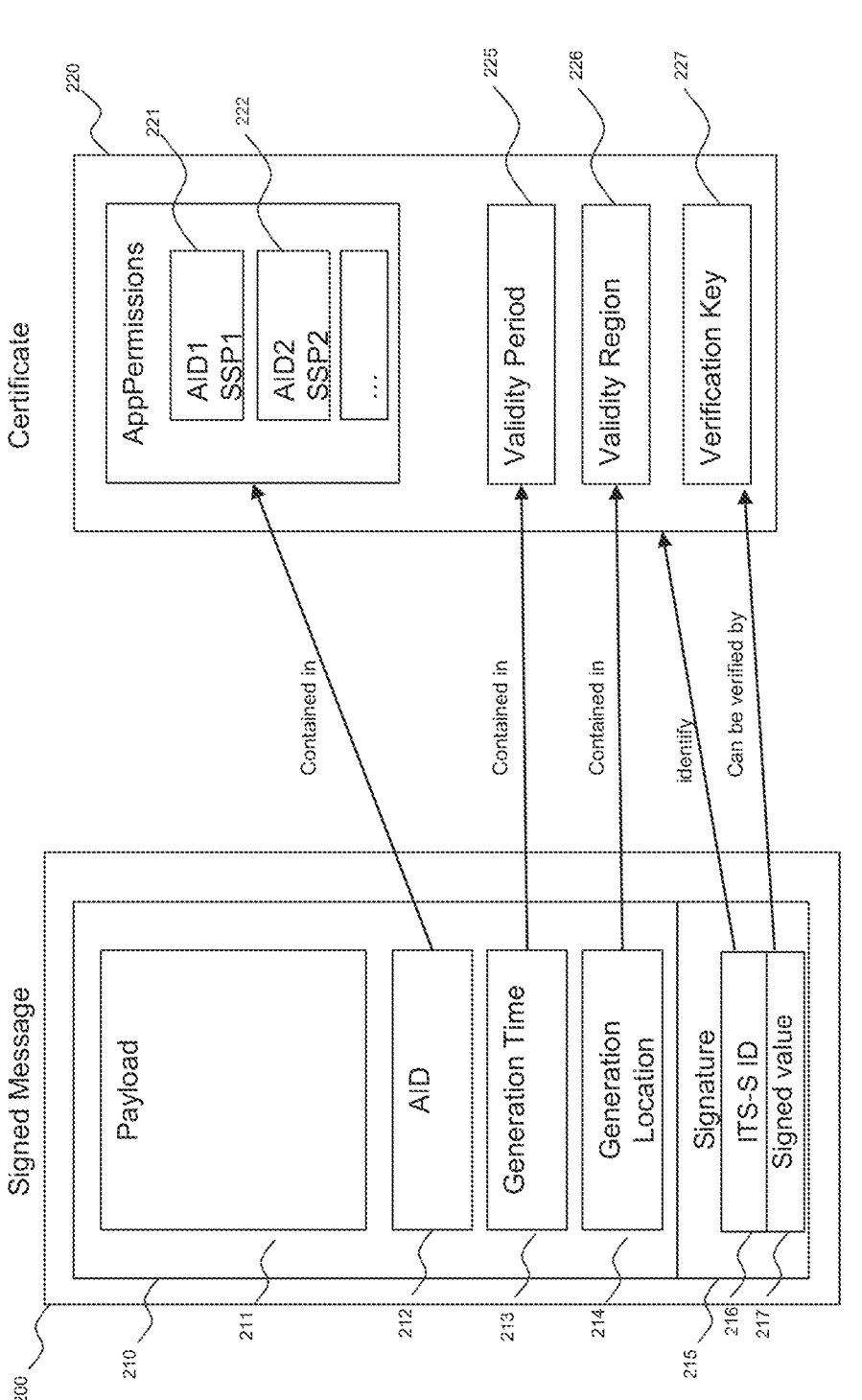
FIG. 2 illustrates the structure of an authorization ticket used as a certificate to secure ITS message transmission as defined in the version 1.1.1 of the ETSI TS 102 731 specification.

FIG. 2 illustrates the structure of an authorization ticket used as a certificate to secure ITS message transmission as defined in the version 1.1.1 of the ETSI TS 102 731 specification. The structure of a signed message and its certificate is described in Annex A.2 of the version 2.0.1 of the ETSI TS 103 097 specification. It applies to both the Enrolment Certificate and the Authorization Ticket. The structure of the certificate is a particular usage of the general signature defined in the specification IEEE 1609.2 and it is similar to the signature system defined in SAE J2945.

As illustrated, a signed message 200 comprises the data 210 to be signed and a signature 215. The data to be signed comprise the payload 211 of the message, an identifier AID 212 of the application, and optionally other information such as the generation time 213, and the generation location 214, which can be omitted if they can be deduced/inferred from the payload content. The signature 215 contains an identifier of the signer (216), i.e the ITS-S ID (IDentifier) which is the pseudonym used by the originating ITS station, and an encrypted hashed value (217) of the data to be signed 210.

The pseudonym 216 allows retrieval of the corresponding certificate 220. The certificate can be for example requested to an Authorization Authority or obtained from a secure memory if it was previously received. As previously mentioned, the emitter (originating) station may have several such identifiers/pseudonyms 216 attributed by the Authorization Authority and thus it may obtain as many certificates 220 as identifiers/pseudonyms 216.

The certificate may specify an authorized period of time, an authorized location and a list of authorized applications with specific permissions.

For instance, the certificate 220 contains a validity period 225, a validity region 226 and a verification key 227. The verification key allows verification of the correctness of the encrypted hashed value 217. The certificate 220 also contains a list of one or more application permissions (221, 222), each comprising an Application identifier (AID1, AID2) and a Service Specific Permission (SSP1, SSP2). The AID identifies a service or an application which uses some types of messages. Currently in ETSI TS 102 965 V1.4.1, one AID is defined per message type (for example CAM, DENM, CPM, VAM).

The certificate 220 thus provides the list of messages that the station is authorized to send.

According to embodiments, a VAM aggregation message is considered. This message references a certificate indicating whether the originating station is allowed to transmit a VAM aggregation message characterizing VRU or not.

For instance, the certificate may be retrieved using an identifier or pseudonym of the originating ITS station. This identifier may be included in the header of the VAM aggregation message or within the signature as shown in the illustrated message.

According to an alternative, the certificate may be included in the VAM aggregation message.

Figure 3:
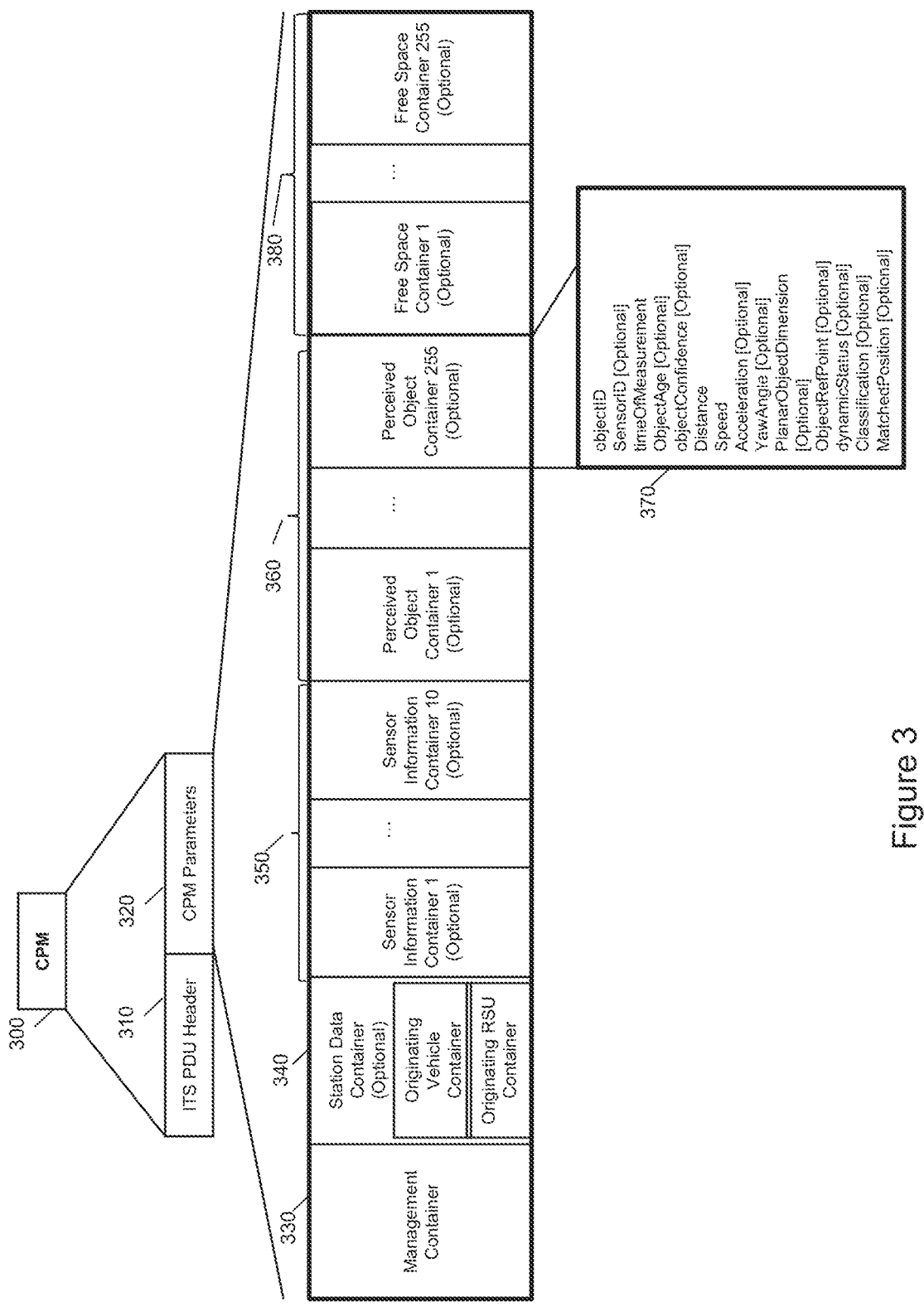
FIG. 3 illustrates the structure of a Collective Perception Message as defined in the version 0.0.20 of the ETSI TR 103 562 specification.

FIG. 3 illustrates the structure of a Collective Perception Message as defined in the version 0.0.20 of the ETSI TR 103 562 specification.

A Collective Perception Message 300 contains an ITS PDU header 310 and a "CPM Parameters" field 320.

The ITS PDU header 310 includes version information of the protocol used, and a message type. In the illustrated example, this is a CPM message type.

The ITS-S ID (IDentifier) of the originating ITS station (i.e., sending the CPM) may not be indicated in the header but rather in the signature of the message (not shown).

The "CPM Parameters" field 320 may contain a Management Container 330, a Station Data Container 340, a set of optional Sensor Information containers (SIC) 350, a set of optional Perceived Object Containers (POC) 360 and a set of optional Free Space Container (FSC) 380.

The Management Container 330 contains information regarding the type (Station Type) of the originating ITS Station and a reference point (Reference Position—defined in the ETSI 102 894 standard) of the originating ITS Station.

The Station Data Container 340 depends on whether the originating ITS Station is fixed or mobile. In a CPM generated by a mobile ITS station, e.g., vehicles 120, 130, Station Data Container 340 is mandatory and contains dynamic information (e.g., speed, heading and optionally other information such as longitudinal and/or lateral and/or vertical acceleration, yaw rate, pitch/roll angles, . . . ) of the originating ITS Station. In a CPM generated by a fixed ITS station, e.g., RSU 111, Station Data Container 340 is optional and provides references to identification numbers provided by a MAP (road topology) Message (as defined in CEN ISO/TS 19091:2017) sent by the same originating ITS station (RSU 111).

Each Sensor Information container 350 is optional and provides information about the sensor capabilities of a given sensor of the originating ITS station for example the type of sensor (camera, infrared camera, radar, radio), its field of view (a polygon representing the observed area on a map). Different container specifications may be used to encode the sensor properties, depending on the station type of the originating ITS station. The Sensor Information containers 350 are attached at a lower frequency than the other containers, as defined in above-mentioned ETSI TR 103 562 specification.

The Perceived Object Containers 360 are provided when objects have been perceived by the originating ITS station thanks to its sensors. A Perceived Object Container 360 is made of a sequence of optional or mandatory data elements (DEs) which give a detailed description of the dynamic state and properties of the detected (i.e., perceived) object.

As shown through fields 370, the perceived object description information may comprise the following fields:

- an identifier (DE ObjectID),
- a time of measurement (DE timeOfMeasurement) corresponding to the time difference elapsed between the measurement time of the provided information and the generation time stated in Management Container 330,
- a distance (DEs xDistance and yDistance) in the x/y plane between the perceived object and the reference point at the time of measurement, and
- a speed (defined by the DEs xSpeed and ySpeed) in the x/y plane of the respective coordinate system with respect to originating ITS station's reference point at the time of measurement.
- acceleration (DEs xAcceleration and yAcceleration) in the x/y plane of the respective coordinate system with respect to originating ITS station's reference point,
- dynamic Status (DE dynamicStatus) or classification (classification DE).

Distance, Speed and Acceleration values can also be provided in three dimensions (respectively with the DEs zDistance, zSpeed and zAcceleration fields) along with the yaw angle of the object (DE yawAngle). Furthermore, a three-dimensional description of an object's geometric extension can be provided (with the DEs planarObjectDimension1, planarObjectDimension2 and verticalObjectDimension fields). Moreover, a fixed ITS station (RSU 111) is also able to provide a map-matching result for a particular perceived object with respect to the MAP information (DE matchedPosition).

The Free Space Containers 380 are used to indicate areas containing no obstacles to the circulation which could create a safety issue.

The various ITS stations thus receive CPMs describing objects perceived by other ITS stations and locally detect, using their embedded perception sensors, objects in their vicinity. Each ITS station combines all this information to evaluate its current environment. The final evaluation is stored in a database referred to as Local Dynamic Map (LDM), defined in the version 1.1.1 of the ETSI TR 102 863 specification. For instance, section 7.6.1 thereof provides a list of information items stored for a nearby vehicle, including identification, position, speed and other dynamic information of the perceived nearby vehicle.

Various combining approaches are known that merge or "fuse" description information describing a perceived object detected from sensor raw data with description information included in a received CPM and describing the same perceived object into description information for the perceived object. They are not further detailed.

For purposes of illustration with reference to FIG. 1, the ITS stations (110, 120, 130, 140) communicate wirelessly with each other by generating and sending ITS messages.

The Vehicle 120 (respectively the pedestrian 140) sends CAMs (respectively VAMs) 160 in order to share its dynamic state and properties, for instance its location ($x_1$, $y_1$).

The RSMS 112 detects vehicle 120 or the VRU 140 by analyzing the scene captured by the field of view 118 of its set of video cameras 115. The associated RSU 111 sends CPMs 150 in order to share its perceived objects (such as vehicle 120 or VRU 140) retrieved from its embedded perception sensors 115. The CPM 150 includes for instance a perceived location $(x'_1, y'_1)$ of perceived vehicle 120 or perceived pedestrian 140.

The Vehicle 130 receives CAM or VAM 160 and CPM 150, both ITS messages giving dynamic state and properties of vehicle 120 or VRU 140, such as locations of the object.

Provided that the certificates attached to CAM or VAM 160 and CPM 150 be validly checked by vehicle 130, the latter relies on all the information provided.

A misbehaving ITS station having a valid certificate may, however, try to disseminate wrong information in ITS messages sent. For instance, vehicle 120 is considered as a malicious entity and sends wrong vehicle 120 location in CAM 160. Consequently, vehicle 130 receives two contradictory information about the location of vehicle 120, namely $(x_1, y_1)$ and location $(x'_1, y'_1)$.

This situation may raise difficulties in traffic management. For instance, vehicle 120 may, in addition to providing the wrong station location, indicate an Emergency Electronic Brake Lights signal in CAM 160. The logics in ITS 100 may then responsively trigger alert signals, such as driver warnings or emergency brakes, at vehicles surrounding the wrong location. This is not an appropriate ITS behavior.

Additional security mechanisms may be deployed at the ITS stations to locally detect how much an ITS station can be trusted or misbehaves and to report a corresponding trust (or confidence) level to other ITS stations. An ITS station may then apply several reception strategies depending on determined trust levels. It may for instance decide whether the data included in received ITS messages need to be considered or be discarded according to a trust level computed for the originating ITS station (that sent the message). Also, an ITS station may also use the trust levels as inputs for merging or fusing operations of description information, in particular to consider how the data included in received ITS messages can be merged with locally sensed sensor raw data.

A self-experienced level of trust in a given ITS station (let us say a perceived station) can be locally estimated by an ITS station based on self-evidence. The Self-Experienced Trust may be computed in different ways. For instance, a first approach evaluates the plausibility and the consistency of perceived-station-related information contained in received ITS messages. The plausibility or consistency check may be carried out with respect to information received previously from the same originating ITS station or from another ITS station near to it and stored in the computing ITS station. Exemplary information that is checked includes position heading, speed, drive direction, yaw rate of the target ITS Station. A second approach directly evaluates the behavior of the perceived ITS Station, for instance by monitoring the number of forwarded/dropped/misrouted messages or packets.

A remote trust level in a perceived ITS station can be obtained from evidence or information items collected from other ITS stations, typically a trust level of the perceived ITS station transmitted by an originating ITS station.

The self-experienced trust level and the remote trust level obtained by an ITS station for a perceived ITS station can be combined locally using for instance the Dempster-Shafter theory, to obtain a single overall target station trust level for the perceived ITS station.

The role of the perceived ITS station within the ITS can also be taken into account when computing an overall target station trust level for the perceived ITS station. Indeed, the role of any ITS station is representative of a trust level of this ITS station. For instance, fixed ITS stations such as RSU 111 may be considered as trustier than private mobile ITS stations such as a mere user vehicle 120.

To optimize use of the V2X network in a different way, embodiments of the disclosure provide that the role of an originating ITS station (or any certified station-related data representing a trust level of this station) be included in the ITS certificate delivered by a certification authority that is next attached to an or any ITS message transmitted by this station.

Since this information is certified (because included in the ITS certificate, for instance the above authorization ticket), it cannot be modified by any malicious entity to raise the confidence or trust level assigned to stolen low-trust certificate (which are easier to steal).

It turns that a receiving ITS station receiving such ITS message with the attached certificate can retrieve the role of the originating ITS station, determine a corresponding trust level of the originating ITS station based on the role, and then process any subsequent ITS message received from the originating ITS station based on the determined trust level. This is again to give high confidence to the content of this message if the role of the originating ITS station corresponds to a high trust level or to discard the content (or give low weight thereof) if the role is of low trust level for instance.

The originating station trust level can be used by a receiving ITS station to graduate the relevancy of the present CPM and/or of any subsequent ITS message received from the originating station.

Figure 4:
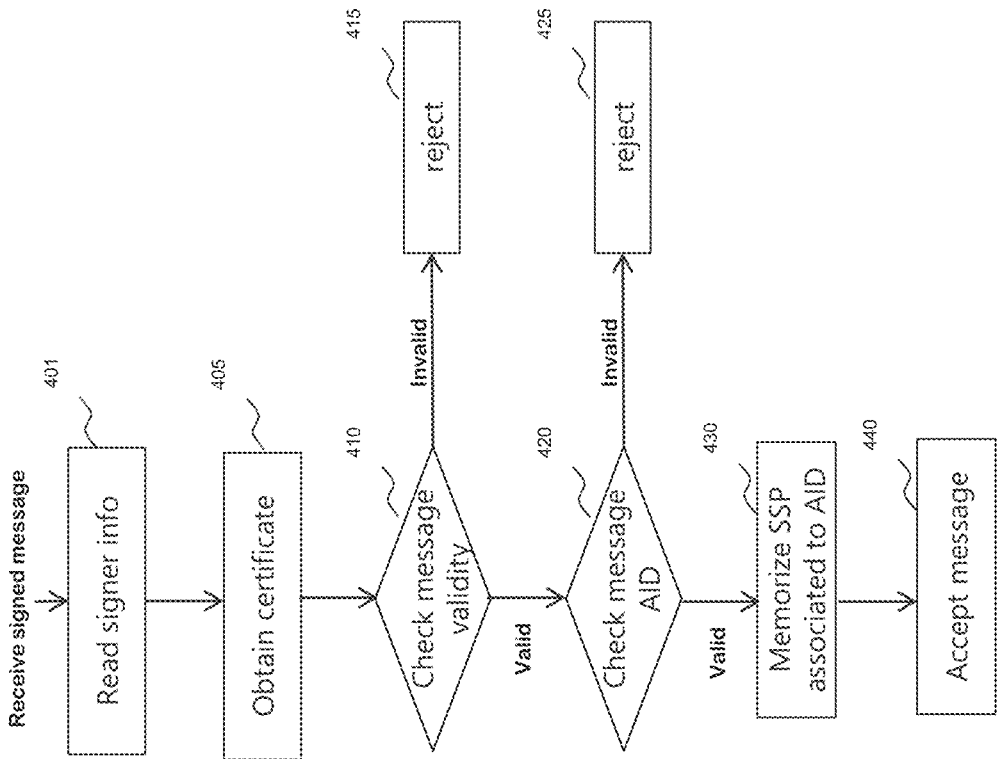
FIG. 4 illustrates steps of verifying a signed message.

FIG. 4 illustrates steps of verifying a signed message. These steps are typically performed at a receiving ITS-S as shown in FIG. 1.

At step 401, after receiving a message, the receiving ITS station can read the signature and obtain the signer pseudonym 216 in the signature.

At step 405, the receiving ITS station can then use the signer's pseudonym to obtain the certificate either from its local memory if it has already obtained it or request the certificate from the Authorization Authority if it does not know it already.

At step 410, the receiving ITS station can check the validity of the signature by using the certificate. For instance the receiving ITS station can check that:

the message generation time 213 is inside the validity period 225, the generation location 214 is inside the validity region 226, the signature 215 contains a hash 217 of the message to be signed 210, encrypted using the key of the signer. This may be checked using the verification key 227.

If the signature is not valid, the signed message is rejected (step 415). Otherwise, the receiving station can check the message permission (step 420).

The receiving station checks that the AID indicated in the message is included in one of the pairs (AID; SSP) of the list included in the certificate. If the AID is not included in this list, the message is not authorized and is thus rejected (step 425).

Figure 5:
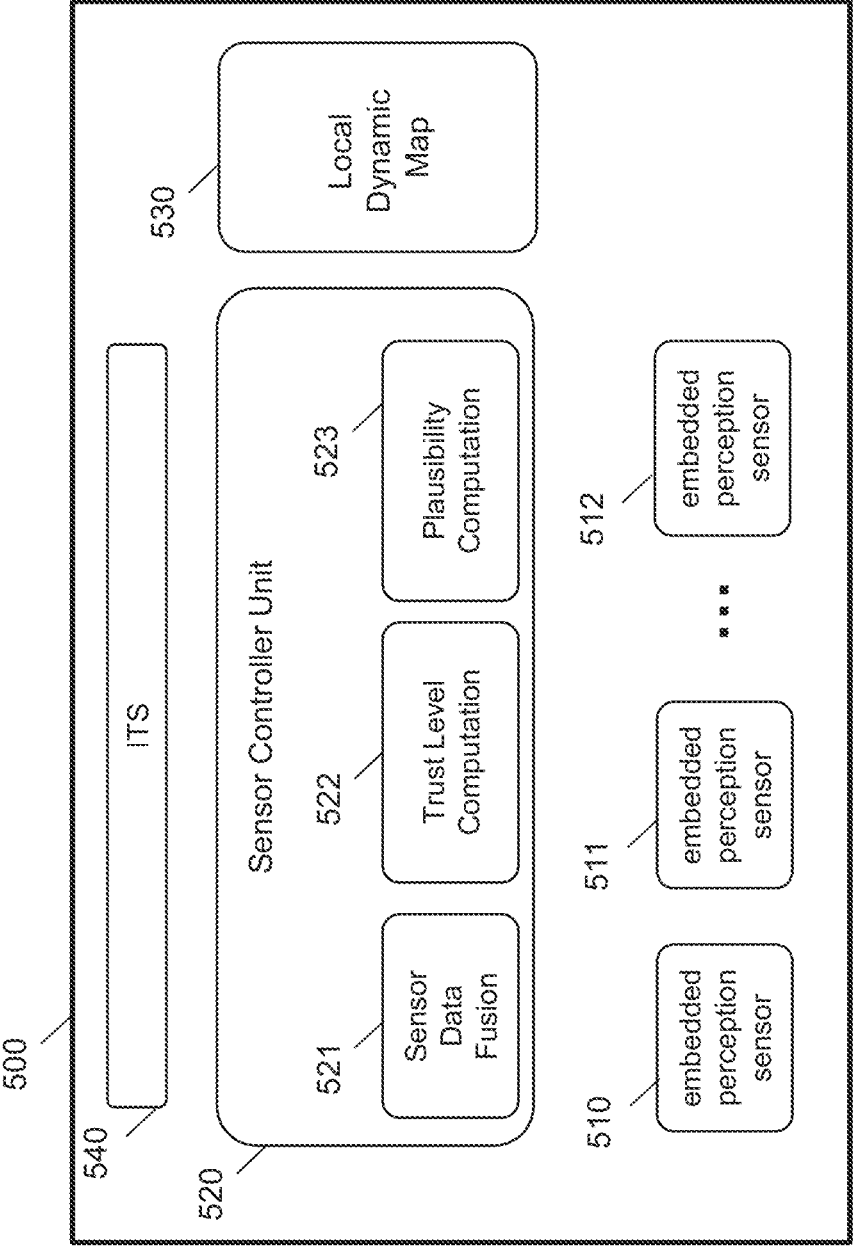
FIG. 5 schematically illustrates functional blocks of an ITS station in accordance with one or more aspects of the present disclosure.

Otherwise, i.e. if the AID belongs to the list of (AID, SSP) pairs included in the certificate, the message is authorized but with a particular SSP (Service Specific Permission). The SSP is thus memorized to be used later when the application will use the content of the message (step 430), and then the message is allowed at step 440. FIG. 5 schematically illustrates functional blocks of an ITS station in accordance with embodiments of the present disclosure. All ITS stations usually act as both originating ITS stations (i.e., sending ITS messages) and receiving ITS stations (i.e., receiving ITS messages).

An ITS station 500 includes a set of one or more embedded perception sensors 510, 511 and 512, a sensor control unit 520, a Local Dynamic Map module 530 and an ITS module 540.

Sensor control unit 520 is the central processing block for the present disclosure. It contains a sensor data fusion module 521, a trust-level computation module 522 and a plausibility computation module 523.

Data fusion module 521 merges perceived objects based on corresponding description information received as inputs. The output of data fusion module 521 feeds Local Dynamic Map (LDM) module 530 to give ITS station 500 a full understanding of its current environment.

Trust level computation module 522 computes an overall station trust level from trust levels obtained in different ways.

Plausibility computation module 523 checks the plausibility of message content received from an originating ITS station in order to infer the reliability of received content and a trust level of the originating ITS station (ITS Station Evaluated Trust Level SETL).

Embedded perception sensors 510, 511 and 512 are based on the same or different technologies such as camera, radar, radio, and lidar. Each sensor acquires sensor raw data from which objects are perceived. A perceived object may be an ITS station. Description information of the perceived objects are sent to sensor data fusion module 521 of sensor control unit module 520. The description information may include all or part of the information items stored in Local Dynamic Map 530, defined in the version 1.1.1 of the ETSI TR 102 863 specification.

ITS module 540 integrates all ITS functionalities. In particular, it manages the emission and the reception of ITS messages (CAM, VAM, CPM, DENM) and implements security mechanisms, including PKI-based mechanisms and those of the present disclosure. It thus stores the authorization tickets (pseudonym certificates) obtained from the AA.

For instance, in ITS message transmission mode, ITS module 540 attaches an authorization ticket to each output ITS message. The authorization ticket may include certified station-related data representing a trust level of ITS station 500 originating the ITS message. Such station-related data are referred to as "Role Trust Level" (RoTL) below.

The Role Trust Level may be assigned to each ITS station during the ITS station manufacturing process and should not be modified later on. The value of the Role Trust Level may be added to the set of information elements established within the ITS station and the Enrolment Authority during the certificate generation process.

Basically, a range of values may be used in order to distinguish the ITS station according to its parameter, for instance an ITS station with a lower Role Trust Level value can be considered a priori as trustier compared to another ITS station with a higher Role Trust Level value (or the reverse depending on how the range is used).

For instance, the Role Trust Level distinguishes between whether the originating ITS station is a mobile ITS station (less trusty—e.g., vehicle or user) or a fixed ITS station (trusty—e.g., road side unit) in the ITS. A mere 1-bit flag may be used.

The Role Trust Level may also take a predetermined number of values (e.g., 4, coded in a 2-bit subfield) corresponding to different levels, for instance:

a value set to 0 (high trust level) for ITS stations relative to law role (authorities) such as traffic management, Roadside Surveillance Monitoring System, law enforcement, state or municipal, police. It may include the fixed ITS stations, a value set to 1 (high-medium trust level) for ITS stations relative to proprietary role such as ITS stations certified by additional dedicated proprietary certification authorities, a value set to 2 (low-medium trust level) relative to public services such as ambulances, school bus, road maintenance, public transit, and a value set to 3 (low trust level) for general role as private vehicular, vulnerable road users, and so on.

Of course, a number of Role Trust Levels different from 4 could be used.

Figure 6:
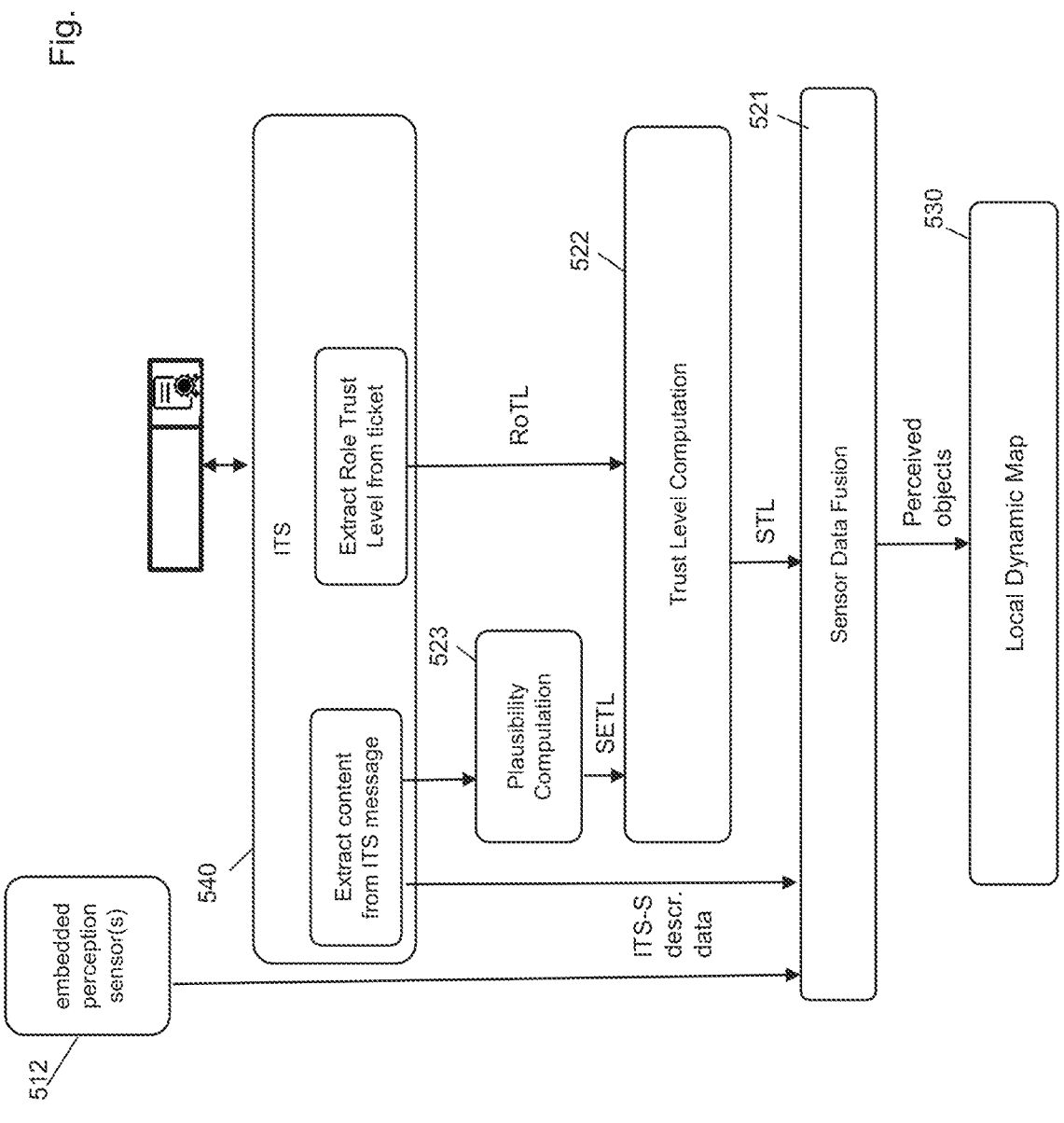
FIG. 6 illustrates the flow of information between the different modules of FIG. 5.

FIG. 6 summarizes the flow of information between the different modules of FIG. 5, in particular the flow of Trust Levels up to trust Level computation module 522.

Trust Level computation module 522 computes an overall station trust level (STL) for each perceived ITS station for which new trust level (either SETL or RoTL) is received. This makes it possible for ITS station 500 to update a list of computed station trust levels which associates an overall station trust level with each perceived ITS station.

The computation may be made periodically based on all new trust levels obtained (e.g., based on received ITS messages) or upon receiving each new trust level.

In one embodiment, the station trust level STL is a binary value indicating whether the perceived ITS station is trusted or malicious.

In a variant, the station trust level STL corresponds to a probabilistic value between 0 (trusty station) and MAX (malicious station).

The list of STLs is transmitted to sensor data fusion module 521 for taking into account when merging description data.

Data fusion module 521 merges perceived objects received from the embedded perception sensors 510, 511 and 512 and perceived objects received from the ITS messages (POCs in CPMs). Data fusion module 521 takes into account the station trust levels from trust level computation module 522 in order to give more or less weight to received description information (of the same perceived ITS station) depending on whether the originating ITS station can be trusted or not (as shown by the STL of this ITS station).

For instance, all received description information of a malicious ITS station (as indicated by the STL of this station) can be discarded from the merger. All the ITS messages received from a malicious ITS station can be rejected.

More sophisticated merging approaches can be used, for instance by weighting description information received from various originating ITS stations based on their respective STLs.

The output of data fusion module 521 is an updated list of perceived objects which is transmitted to Local Dynamic Map 530 for updating of its database of perceived objects.

FIG. 7 illustrates different Service Specific Permission (SSP) items that may be specified in the certificate, according to embodiments of the disclosure.

As described previously, CPM messages may be signed using private keys associated to Authorization Tickets that contain SSPs of type BitmapSsp as specified in ETSI TS 103 097. The SSP may be composed of 3 octets, with the first one identifying the SSP version.

Each bit of the SSP may give a permission for a specific usage of the CPM message. It can control the presence of some fields, the range of values for some fields but also the authorized changes of states in the receiver or specific actions to be performed by the receiver.

In the illustrated example, the SSP indicates a level of trust of the originating station, and whether the originating station is authorized to send information characterizing an object of Free Space type, Road Users type, or Vehicle type.

More specifically, in the proposed SSP, only 5 bits (positions from 0 to 4) in the first octet are used. The remaining bits are not used and should be set to 0.

The bit in position 0 indicates with the value 1 that the emitting station has a highly trusted role. This can be used for ITS stations relative to law role (authorities) such as traffic management, Roadside Surveillance Monitoring System, law enforcement, state or municipal, police. It may include the fixed ITS stations.

The bit in position 1 indicates with the value 1 that the emitting station has a medium trust level, for example relative to public services such as ambulances, school bus, road maintenance, public transit.

If these 2 first bits are set to 0, this indicates a normal trust level for general role as private vehicles, vulnerable road users, and so on. Note that the 2 bits cannot be set simultaneously to 1.

The bit in position 2 indicates the authorization for the CPM message to contain Free space information. The free space information can be added to the CPM message as a new object type or as a new container in the CPM message.

The bit in position 3 indicates with the value 1 the permission to include objects of type VRU in the CPM message.

The bit in position 4 indicates with the value 1 the permission to include objects of type vehicle in the CPM message.

In some cases, it can be useful to forbid (i.e. not authorize) the ITS station to report a specific type of object, for instance because some objects may require specific sensor capabilities or specific analytic algorithms or a specific field of view.

For example, a camera configured with analytic dedicated to vehicle detection and tracking may not be able to detect and track correctly pedestrians or cyclists in this example the bit in position 3 would have the value 0 to forbid VRU reporting in the CPM. Another example is a camera with an infrared sensor installed to look at the waiting person at a traffic light will be able to detect a pedestrian with good accuracy but it will not be able to detect vehicles. In this example the bit in position 4 would have the value 0 to forbid reporting of vehicles in the CPM message.

According to embodiments, a new kind of authorization is provided to an ITS station equipped with a radio sensor (for instance a RSU). This new kind of authorization allows the ITS station to detect VAM messages from VRUs and to aggregate these VAM messages in a new kind of message called 'VAM aggregation message'. Such ITS stations may be called 'aggregator' or 'aggregation station'.

In embodiments, the VAM aggregation message is a dedicated CPM message. However, the VAM aggregation messages are not generally limited to CPM messages.

For instance, an ITS station having an aggregator role may have the authorization to report only VRU objects.

As will be described hereafter, the VAM aggregation message defined in the present embodiments allows retransmitting the content of the VAM messages to other stations and to some extent, it may be useful to limit the number of VAM sent over the network as a VRU station receiving it may consider that there is no need to send VAM to other stations as the VAM aggregation message already did.

To generate the VAM aggregation message, the aggregator adds in it a perceived object (object of type pedestrian or cyclist) for each received VAM message with a different VRU ID. In other words, the structure of the object 370 is filled with the corresponding information extracted from the VAM message.

In order to identify such an aggregator, (i.e. a ITS station equipped with a radio sensor and which has the ability to generate VAM aggregation message), the bit in position 1 of the SSP field may be set to 1 to indicate that it is a trusted VAM aggregator.

In another embodiment, a specific bit may be reserved to indicate that the CPM is a VAM aggregation message and can be trusted for this role.

Alternatively, two bits could be used to indicate separately the role of a VAM aggregator and the trust level in this particular role.

The combination of the different bits of the SSP may be useful to indicate more precisely the permission of the sending ITS station. A ITS station may be able to send a first type of object with a high level of trust and a second type of object with a lower level of trust.

For example, a public transport bus with sensors dedicated to pedestrian detection may send CPM with a high level of trust for VRU detection and CPM with a normal level of trust for vehicle detection. In this example, the bus may advantageously have two certificates, each certificate authorizing the CPM AID but with different SSP values: in the first SSP, the bit in position 1 for trusted role is set to 1 and the bit in position 3 for VRU reporting is set to 1 too while in the second certificate, the SSP has no specific trust (bits in positions 0 and 1 are both at 0) and the SSP authorizes any type of content (bits in positions 2 to 4 are set to 1). The ITS station of the bus will send alternatively CPM messages with different certificates and thus different identities (ITS-S ID) and different authorizations (SSP) for the same CPM application ID (AID).

Figure 8:
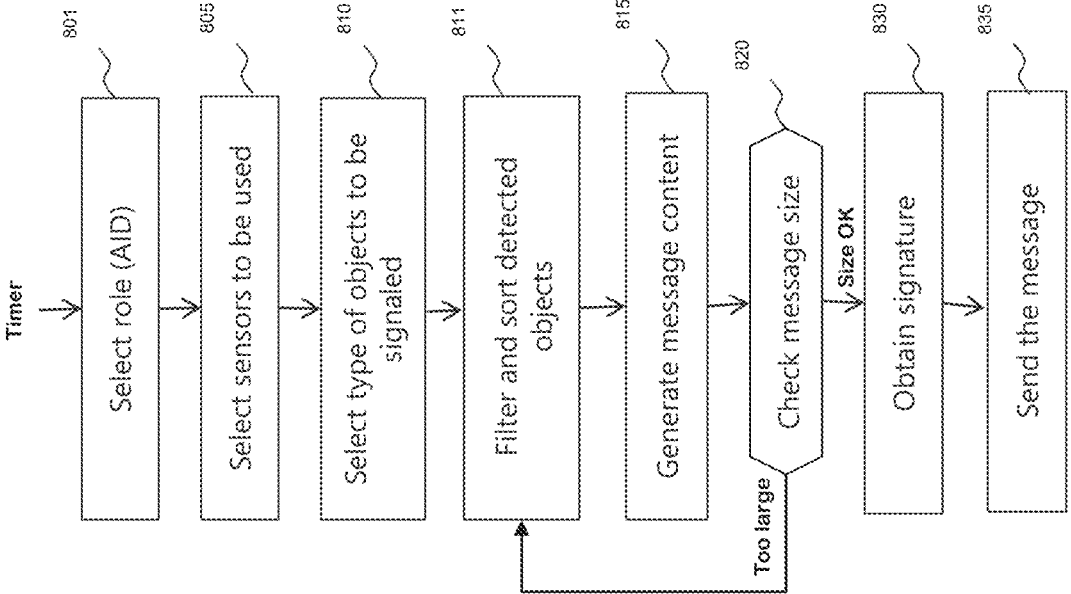
FIG. 8 illustrates, using a flowchart, steps of generating and sending a VAM aggregation message by an ITS station according to one or more aspects of the present disclosure.

FIG. 8 illustrates, using a flowchart, steps of generating and sending a VRU Awareness Message (VAM) aggregation message by an ITS station according to embodiments.

In this example, the VAM aggregation message is a CPM message comprising a signature including an identifier of the originating station which allows to retrieve the certificate. However, embodiments are not limited thereto. The VAM aggregation message can be of another type than a CPM and the certificate may be included in the message itself or otherwise referenced.

According to embodiments, these steps may be used to create (generate) a 'VAM aggregation message' aggregating VRUs positions retrieved from VAM messages sent by these VRU stations as described with reference to FIG. 10.

In the illustrated example, the process is triggered by the expiry of a preset timer. However, embodiments are not limited thereto and it could be triggered otherwise. For example, it could be triggered by the reception of a VAM message, or the detection of an object (e.g. a VRU) by a sensor.

At a first step 801, the emitting station selects a role, i.e. a pseudonym to be used, as it can be involved in several possible roles or applications. In practice, this is done by selecting the ITS-S ID of the station.

For instance, a vehicle can be used part time as a road surveillance vehicle or police patrol vehicle and the rest of time, as a tourism vehicle. In this example, the vehicle can be authorized to send CPM messages during its work mission (official surveillance role) so that the receiving station should attribute a higher trust to the CPM message. Outside of the work mission, the road surveillance vehicle may not have special privilege and should thus send CPM messages with a normal trust level.

Another example is a public transport vehicle, such as a bus or an autonomous shuttle: as it moves, the transport vehicle should have a normal privilege and send CPM messages with a normal level of trust, while as it stops and opens its doors, the transport vehicle should have a higher level of trust because it may detect and signal some people or pets (VRU) that may enter in or come out from the transport vehicle. The other vehicles should attribute a high level of trust to the CPM messages sent by the bus when signaling VRUs.

As explained previously, the ITS station may have different certificates corresponding to different identities (ITS-S ID) and different permissions (SSP) for the same service (AID, which basically corresponds to the type of message to be sent, for instance a VAM, a CAM, or a CPM). When selecting a role (i.e. an ITS-S ID), the emitter also selects a certificate with an SSP consistent with the selected role i.e. with a different value of the trust level indicated in the SSP.

For the example of the road surveillance vehicle, the selected certificate should contain a SSP with the bits indicating that the originating vehicle is highly trusted and that it is certified to signal objects of VRU type and vehicles. On the contrary, the certificate corresponding to the role of tourism vehicle in the above example indicates a normal level of trust and that any type of object can be signaled.

For the example of a transport vehicle, the SSP of the certificate should signal that the emitter is trusted and that it can send only information regarding VRU when it stops, and when it moves, the certificate should indicate a normal level of trust but allow information related to VRU and vehicles and free space to be sent.

At step 805, the emitter ITS station selects the sensors which are compatible with the selected role as not all ITS station sensors may be compatible with each role. When a role with a high level of trust is selected, only corresponding certified sensors should be used, i.e. sensors which are able to detect objects of the corresponding type (for example VRU) with a high level of trust.

For example, a road side unit (RSU) station having different camera sensors could be authorized to select only cameras with infrared detection when a high level of trust in VRU is required.

For the above example of public transport, when it stops, the bus may select only the sensors for VRU detection (camera for detecting VRU, VAM message detector) and not the classical vehicle sensors (radar and lidar for traffic monitoring) that should be selected as the transport vehicle is moving.

Another example of sensor is a radio which is used to receive VAM messages from VRU. The VAM message can be used to detect the VRU and such information can be transmitted in the CPM message. However, such a sensor is able to detect only VRU and not vehicles.

Next, at step 810, the emitter selects the type of objects to be signaled in the CPM message, i.e the objects detected by the sensors which type is compatible with the currently selected role. In practice, the detected objects are filtered so as to keep selected objects only.

Advantageously, this filtering allows limiting irrelevant (or redundant) information and saving radio bandwidth.

For example, only VRU or only vehicles may be selected depending of the SSP.

Other rules may be used for filtering the detected objects. For instance, a detected object may be discarded if its position and the predicted trajectory are outside of the road. Also, a detected object may be discarded if it has not moved significantly since the last time it was signaled in a previous CPM message and if the last time is not too long. For example, the rule could be that an object is signaled at least once per second, but it can be signaled earlier if it has changed its position of more than 3 meters or if its speed has changed of more than 2 meters per second. The values (the rules) used to select the objects to signal can be changed in function of the role of the ITS emitter. For example, when using a role of road surveillance, all objects could be signaled 2 times per second at least.

According to another rule, a detected object may be discarded if it has already been signaled by a CPM of a second ITS station, for instance depending on the trust level of this second station. This rule allows avoiding redundancy. For instance, if the second ITS station has a high level of trust, all the receiving stations should take into account the signaled object. Otherwise, if the second ITS station has only a normal level of trust, a receiving station may not use the signaled object in its fusion algorithm and thus may ignore the object. Thus, in embodiments, the emitting ITS station keeps objects which have not been already signaled by a highly trusted ITS station, and may remove objects which have already been signaled by trusted stations. In other words, the method according to embodiments may comprise a step of filtering the plurality of detected VRUs in order to discard the detected VRUs that have been already signaled by a ITS station having a given level of trust so that only detected VRUs that have not been already characterized in a CPM sent from a trusted ITS station are characterized in the generated CPM.

The selected objects may be sorted according to their relative importance, for instance depending on the confidence in the detection and on the potential impact on safety.

The (content of) the CPM message is generated at step 815 with the selected sensors and objects according to the structure described with reference to FIG. 3. The message may be encoded and compressed using ASN.1 Unaligned Packed Encoding Rules.

The message size is then checked (step 820) in order to determine whether its size is compatible with the transport protocol.

If it is too large, the process goes back to step 810 to select a more limited list of objects for this CPM message. If the objects are sorted, this is done according to their relative importance. In practice, the objects which are not selected for the current CPM will be selected in the following CPM message.

Otherwise, if the size is ok, a signature is obtained (for instance it is generated by the ITS station). The message is signed at step 830 using the certificate corresponding to the role (i.e. to the ITS ID) selected at step 801.

The message is then sent at step 835.

The process then sets the next emission time (e.g. sets a timer at the expiry of which the message is sent). The CPM can be sent for example 10 times per second. In embodiments, the frequency may be decreased if congestion is detected because of the limited bandwidth. The frequency may also be adjusted in function of the selected role. In other words, the timer is set based on a current role (i.e pseudonym or ITS ID) selected by the originating station and the value of the timer is proportional to the level of trust associated with the selected role, i.e the selected pseudonym ITS ID.

For instance, a higher frequency may be required when an important role is selected. For example, taking the above example of the public transport vehicle, when opening its doors, the CPMs may be emitted at the highest possible frequency to improve the awareness of the other vehicles.

If too many objects were present in step 820, it is possible also to send again a new CPM message immediately. The new message will allow to signal the object which were not included in the first CPM message.

Figure 9:
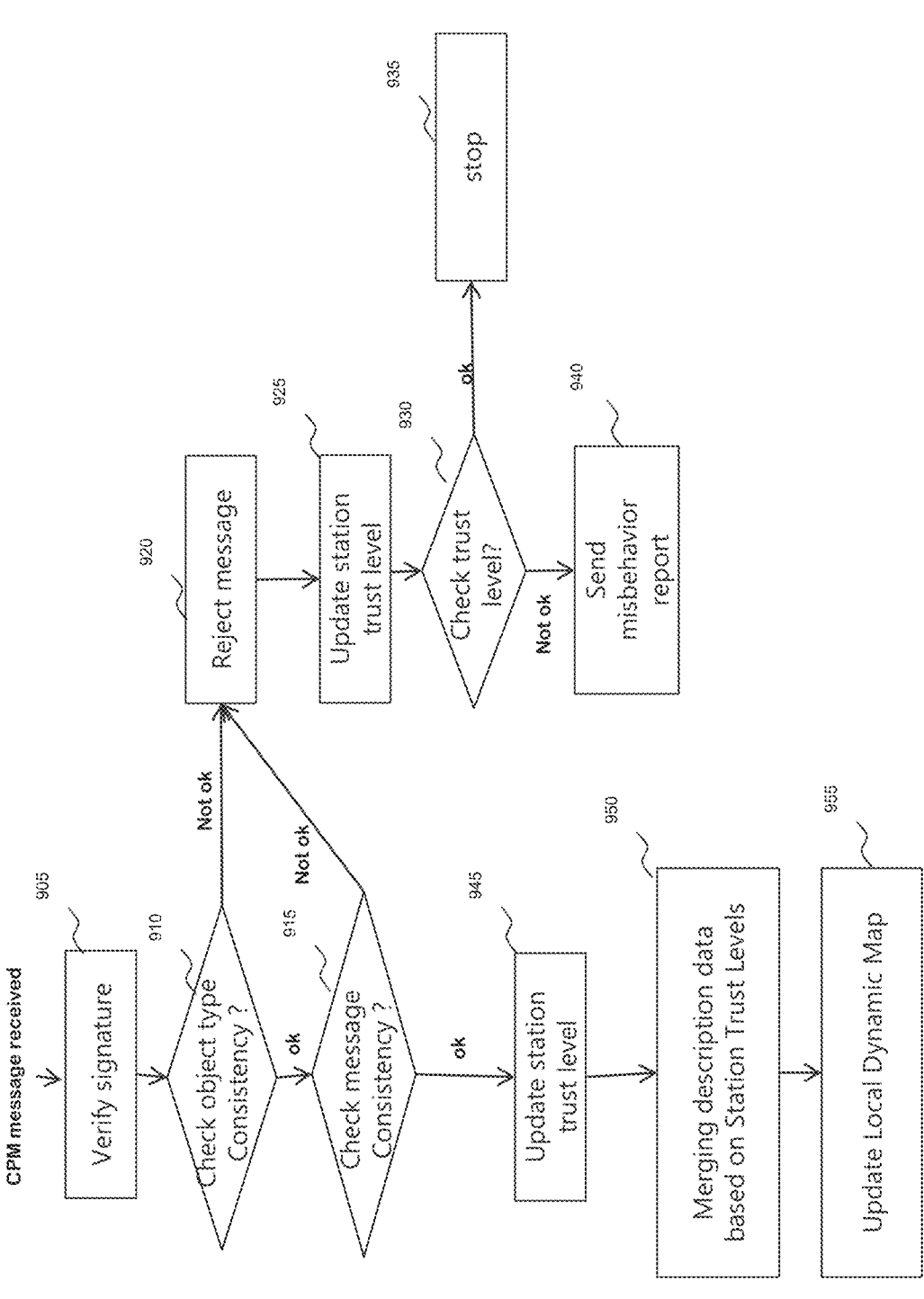
FIG. 9 illustrates, using a flowchart, steps of receiving a VAM aggregation message by an ITS station.

FIG. 9 illustrates, using a flowchart, steps of receiving a VRU Awareness Message (VAM) aggregation message by an ITS station, the VAM aggregation message referencing a certificate.

In this example, the VAM aggregation message is a CPM message comprising a signature including an identifier of the originating station which allows to retrieve the certificate. However, embodiments are not limited thereto. The VAM aggregation message can be of another type than a CPM and the certificate may be included in the message itself or otherwise referenced.

At a first step 905, the receiver verifies the signature of the message for instance according to the steps described with reference to FIG. 4 using the AID of the CPM message. If the signature is valid, the permissions (SSP) indicated in the certificate corresponding to the AID of the message are memorized and the process goes on. If the signature is not valid, the message is rejected and the process stops.

Next, at step 910, the receiving ITS station checks whether the types of the objects described in the CPM message are compatible with the SSP. This is because the SSP may indicate that only some types of objects are acceptable (for example only objects of VRU type or only objects of vehicle type).

If some object types are not acceptable, the message is rejected in step 920. Alternatively, the objects which type is incompatible with the SSP could be discarded while the objects of compatible type would be kept.

At step 915, the receiving ITS station checks the message consistency or plausibility. In practice, this is done by the plausibility computation module 523. There are several types of consistency, notably intra-consistency and inter-consistency.

The intra-consistency is the intrinsic consistency of the message itself. Intra-consistency is achieved only if all the message fields which are mandatory are present, and if the indicated values are in acceptable ranges.

The inter-consistency is the consistency between several successive CPM messages from the same source (ITS emitting station). It is recalled that the source ITS-S (i.e. the originating station) is indicated in the ITS ID (216) indicated in the signature of the CPM message. For example, if in an object description, a sensorID is indicated for this object, the sensor should be described in the current CPM or in previous CPM message from the same source, and the position of the object should be inside the field of view of the sensor. The objectAge should increase for an object which is indicated in several successive CPM messages, and the increase should be equal to the difference of measurement times. The motion of the signaled objects (position, speed, acceleration) should also be consistent with motion of physical objects. Exemplary information that is checked includes position heading, speed, drive direction, yaw rate of the target object. A higher level of consistency is expected for a message sent from a highly trusted emitting station. Hence, a threshold on acceptable discontinuities in the different physical values can be defined. It may be adjusted in function of the declared trust level of the CPM message.

If the message is not consistent, it should be rejected at step 920. Otherwise, it is used in step 945.

Next step is step 945 where the receiving ITS station may update the trust level of the sending ITS station. This is made by the trust level computation module 522.

For instance, the trust level of the emitter ITS station can be increased if all values are consistent or if the trust level of the SSP is high (i.e. the bit in position 0 is set to 1). Several technics, in particular based on the Dempster-Shafter theory can be used.

Advantageously, the CPM message allows the receiving station to update its list of station trust levels.

The updated list of station trust levels can then be used to adapt the processing of ITS messages depending on the trust level associated with the corresponding originating ITS stations. For instance, it may be used to adjust the fusion of perceived station description information obtained from various sources including the sensors 510, 511, 512 and received CPMs.

At step 950, sensor data fusion module 521 performs the sensor data fusion by retrieving and merging (description data of) perceived objects received from the embedded perception sensor and from several received ITS CPM messages by considering the updated list of overall station trust levels on the ITS stations. Various fusion models are known and can be used.

Various other ways of taking into account the station trust levels can be used.

For example, with graduated trust levels (from 0 to MAX), weights may be assigned to description information based on the graduated trust levels, in order to give more weight for description information transmitted by trustier originating ITS stations than for description information transmitted by less trusted originating ITS stations.

The output of step 950 is an updated list of perceived objects which is stored at step 955 in LDM 530.

When, at step 920, the CPM message is rejected because of inconsistency, the content of this message is not used. At step 925, the trust level of the sending ITS station is updated by the trust level computation module 522. The trust level of the emitter ITS station is decreased and the list of station trust levels is updated.

Next, at step 930, the updated trust level of the emitter ITS station is evaluated in function of the trust level set by the SSP of the received message (i.e the value of the bits in positions 0 and 1).

If the emitting station has a high trust level (for example for road surveillance authority), a higher level of consistency is expected for its message.

If the updated trust level of the emitter ITS station is too low compared to its trust level set in the SSP, the receiving station can create and emit a misbehavior report at step 940 in order to signal the misbehavior of the emitter ITS station to other ITS participants and/or to a central authority in charge of evaluating the security of the system. This authority can invalidate some certificate if it evaluates that the corresponding ITS station has been compromised.

Figure 10:
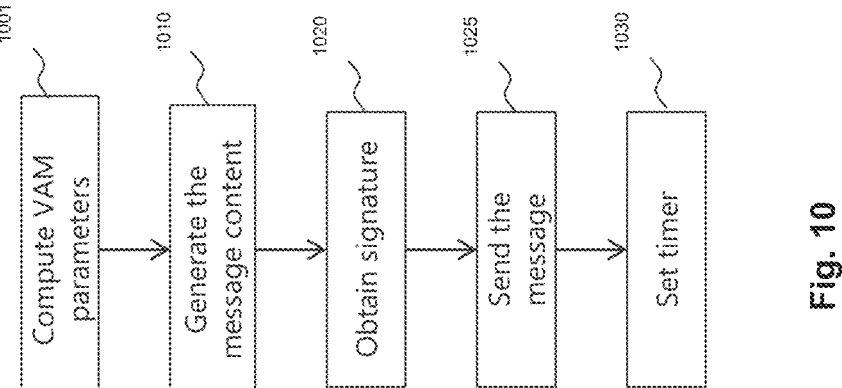
FIG. 10 illustrates, using a flowchart, steps of sending a VAM message by a VRU ITS station.

FIG. 10 illustrates, using a flowchart, steps of sending a VAM message by a VRU ITS station. It is recalled that this message allows the VRU ITS station to indicate, notably, its position.

According to embodiments, the process exemplified in FIG. 10 is triggered by the expiry of a timer. However, embodiments are not limited thereto and it could be triggered otherwise. For example, it can be triggered when the position of the VRU or its speed has changed significantly.

First, at step 1001, the VRU ITS station computes variable parameters to be indicated in the VAM message. The parameters include for instance the position, speed, and direction of the VRU.

Next, the content of the VAM message is generated at step 1010. The format of the content of a VAM message is described hereafter with reference to FIG. 11.

After the generation of the VAM message content at step 1010, the emitting VRU ITS station obtains the signature (step 1020), for instance the VRU ITS computes the signature by itself. Advantageously, the VRU identifier (or more exactly its pseudonym) is indicated in the signature of the message rather than in the header of the VAM.

The signed VAM message is then sent at step 1025.

At step 1030, a timer is set. The expiry of this timer will trigger the next VAM transmission. Embodiments are not limited thereto and other events can trigger the next VAM transmission.

According to embodiments, the timer may be set based on a regular frequency for example 5 times per second. This timer value may be different when the VRU sending the VAM message is part of a cluster in which a master or leader VRU sends a VAM message for all the other VRUs of the cluster which do not send VAM message (or at a lower frequency, e.g. once every 2 seconds) while they belong to the cluster. The cluster feature will be described hereafter with reference to FIG. 11. The timer value may be increased when a VRU is entering a cluster and decreased when leaving the cluster.

The timer can also be adapted in function of the presence of a VAM aggregation message, as described previously. For instance, when detecting a VAM aggregation message, the VRU ITS station can decrease the frequency of emission of its VAM message because its own information is propagated to the other ITS participants.

The VRU ITS station can also adapt the frequency of the VAM message to the trust level of the ITS station from which is the VAM aggregation message. If the aggregation message emitter is highly trusted, all the receiving stations will take into account the signaled VRUs so that they can each decrease their own VAM emission frequency.

Figure 11:
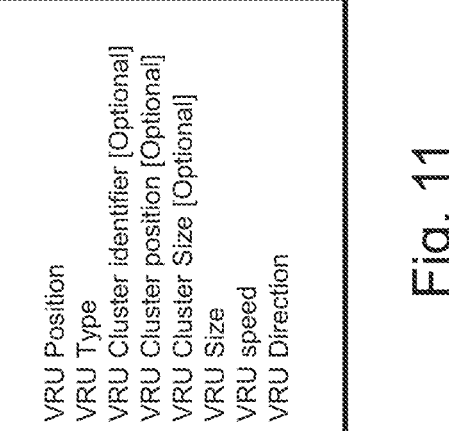
FIG. 11 illustrates the format of the content of a VAM message according to one or more aspects of the present disclosure.

FIG. 11 illustrates the format of the content of a VAM message according to embodiments.

As shown in this figure, the VAM message indicates the VRU position, its type (for instance pedestrian or cyclist), its size, its speed and its direction, as described in the specification ETSI TS 103 300-2.

Some other optional parameters may be used to describe the VRU as a member of a cluster of VRUs.

A cluster of several VRUs may be defined when these VRUs are located close to each other, and have similar speeds and directions. A VRU station may be elected as the leader or master so as to send VAM messages in the name of the cluster so that the other VRUs (non-leader or slave) will not have to send VAM messages on their own or at a lowered frequency as mentioned with reference to FIG. 10.

In practice, an ITS station can decide to join an existing cluster or to go out from a cluster. In both cases, it signals its decision to the leader or master of the cluster so that the cluster description may be updated.

Thus, the VAM may include information to describe a cluster comprising several VRU ITS stations, the VRU associated with the receiving ITS station being a member of the cluster. The information to describe the cluster includes an identifier, a position and/or a size (number of VRU ITS stations) of the cluster. The cluster comprises a leader/master VRU ITS station which sends VAMs in the name of the VRUs of the cluster. The timer used for sending a VAM by the VRU ITS stations of the cluster other than the leader/master VRU ITS station is higher than the timer used by the leader/master VRU ITS station and higher than the VRU ITS stations that do not belong to any cluster. The method may comprise a step of updating the information to describe a cluster upon reception of a message from an ITS station requiring to join or to quit the cluster.

Advantageously, the definition of clusters of VRUs may decrease the risks of congestion in the radio bandwidth, as such clusters allow decreasing the number of VAM messages sent by the VRUs.

According to embodiments, other ways of decreasing the risks of congestion are proposed, which do not require VRU stations to explicitly create a cluster. These embodiments may thus be simpler.

According to embodiments, the VRU may adapt its behavior, for instance the technology used for transmitting the VAM, and/or the frequency of sending its VAM messages, upon receiving a VAM aggregation message (which can be a CPM) which comprises information on its own position. This is because the VRU may consider that the VAM aggregation message already advertises its identity and its position to other stations so that here is no need to send a VAM message to them or not with the same reliability or frequency.

For instance, adapting its behavior may consist in sending a VAM message in a secondary frequency band (thereby the main frequency band is less used) or with a different transmission technology which will generate less congestion (for instance Direct link over LTE), when the VRU ITS station has previously received a 'VAM aggregation message' in the main frequency band with the identification of the VRU and its position.

For instance, to generate less congestion, a transmission technology can use a higher transmission speed with a better modulation and thus a lower length of occupation of the bandwidth.

The main technology can be ITS G5 in the 10 MHZ high priority band in the range of 5.9 GHz. The second technology can be 3GPPP LTE connection in another band of 10 Mhz in the range of 5.9 GHz or on another range.

Adapting its behavior may also consist in adapting the frequency of the VAM message as described before (i.e. the timer set at step 1030), for instance depending on the trust level of the aggregator.

Advantageously, the number of VAM messages sent in the main radio frequency band is thus decreased.

According to embodiments, a specific message (or invitation) could be used to invite the VRUs to send VAMs to a VAM aggregator that may handle the retransmission of the VAM for the VRUs. In other words, a service announcement may be sent by an aggregator station to propose an aggregation service to VRUs. For instance, this invitation (to send VAMs) may be a Service Announcement Extended Message (SAEM) which format is described in the specification ETSI TS 102 890-1 V.1.1.1, and in which an identifier of the VAM aggregation service could be indicated.

This message could typically be transmitted in another radio band or with another radio technology, for example using a direct connection on mobile LTE technology between the aggregator and the VRU station.

When receiving this specific invitation from the VAM aggregator, a specific VRU station can decide to switch to the direct connection on LTE to send all or part of the next VAM messages to the aggregator. The VRU station can also send a specific message to the aggregator to inform it that it accepts or refuses the invitation. It the invitation is accepted, the aggregator then receives the VAM message on the LTE connection, generates the VAM aggregation messages and send them on the main frequency using for instance the ITS G5 protocol.

According to another aspect, there is provided a method for communicating in an Intelligent Transport System, ITS, comprising ITS stations, the method comprising the following steps at an originating one of the ITS stations:

receiving a plurality of VRU Awareness Messages, VAM, each VAM being sent by a Vulnerable Road User, each VAM describing a Vulnerable Road User;

generating a VAM aggregation message, characterizing the Vulnerable Road Users described by the plurality of received VAMs, and transmitting the generated VAM aggregation message to one or more other ITS stations.

The another aspect allows an ITS station to efficiently aggregate VAM messages from VRUs and retransmit information about the VRUs to other ITS stations. Consequently, the security is improved as some ITS stations may not be able to detect or identify VRU stations by themselves but thanks to the VAM aggregation message, these stations can still be informed of the VRUs.

According to embodiments, the VAM aggregation message is a Collective Perception Message, CPM.

According to embodiments, the plurality of VAMs are received from VRU further to an invitation to send VAM, the invitation being sent from the originating station to the VRUs.

According to embodiments, the invitation was sent using a different transmission technology or over another frequency band than the one used to transmit the generated VAM aggregation message.

According to embodiments, transmitting the generated VAM aggregation message is performed upon expiry of a timer.

According to embodiments, the timer is set based on a current identity used by the originating station and/or the value of the timer is proportional to a level of trust associated with the current identity used by the originating station.

Although the present disclosure has been described herein above with reference to specific embodiments, the present disclosure is not limited to the specific embodiments, and modifications will be apparent to a skilled person in the art which lie within the scope of the present disclosure.

Many further modifications and variations will suggest themselves to those versed in the art upon referring to the foregoing illustrative embodiments, which are given by way of example only and which are not intended to limit the scope of the disclosure, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of communication in an intelligent transport system including an originating ITS station, the method at the originating ITS station comprises:

sending an ITS message that references a certificate, the certificate includes information related to permissions granted to the originating ITS station, wherein the included information comprises, for one or more permissions, respective levels of trust, each level of trust being used by the originating ITS station to determine whether a corresponding message type or content is permitted to be transmitted, and wherein the ITS message include data indicating the applied level of trust.

2. The method of claim 1, wherein the level of trust corresponding to a permission granted to the originating ITS station is indicative of a level of trust to be put by a receiving ITS station on a content of the ITS message generated according to the granted permission.

3. The method of claim 1, wherein the level of trust corresponding to a permission granted to the originating ITS station is either high or low, with respect to threshold.

4. The method of claim 1, wherein the level of trust corresponding to a permission granted to the originating ITS station depends, at least in part, on the sensing capabilities of the originating ITS station.

5. The method of claim 1, wherein the level of trust corresponding to a permission granted to the originating ITS station is updatable over time.

6. The method of claim 1, wherein the level of trust corresponding to a permission granted to the originating ITS station is either set by the originating ITS station itself or by an external Authorization Authority.

7. The method of claim 1, wherein the permissions granted to the originating ITS station and the respective levels of trust are encoded in a Service Specific Permission bitmap field.

\* \* \* \* \*